(12) United States Patent
Adkins et al.

(10) Patent No.: US 9,044,741 B2
(45) Date of Patent: Jun. 2, 2015

(54) PROCESS FOR CONVERTING BIOMASS TO A FUEL

(75) Inventors: Bruce Adkins, League City, TX (US);
Dennis Stamires, Dana Point, CA (US);
Robert Bartek, Centennial, CO (US);
Michael Brady, Studio City, CA (US);
John Hackskaylo, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 239 days.

(21) Appl. No.: 13/446,926

(22) Filed: Apr. 13, 2012

(65) Prior Publication Data

US 2013/0000183 A1 Jan. 3, 2013

Related U.S. Application Data

(60) Provisional application No. 61/475,129, filed on Apr. 13, 2011.

(51) Int. Cl.
*C10L 1/18* (2006.01)
*B01J 29/40* (2006.01)
*C10G 3/00* (2006.01)

(52) U.S. Cl.
CPC .............. *B01J 29/40* (2013.01); *B01J 2229/18* (2013.01); *C10G 3/49* (2013.01); *C10G 3/57* (2013.01); *C10G 2300/1014* (2013.01); *C10G 2400/02* (2013.01); *C10G 2400/04* (2013.01); *C10G 2400/08* (2013.01)

(58) Field of Classification Search
CPC .............. C10L 1/00; C10L 1/02; B01J 29/40; B01J 2229/18
USPC ..................................... 44/628, 605, 606, 500
See application file for complete search history.

(56) References Cited

U.S. PATENT DOCUMENTS

| | | | |
|---|---|---|---|
| 3,843,741 A | 10/1974 | Yan | |
| 4,423,299 A | 12/1983 | Gurol et al. | |
| 4,483,764 A | 11/1984 | Hensley et al. | |
| 4,968,650 A | 11/1990 | Chu et al. | |
| 5,171,921 A | 12/1992 | Gaffney et al. | |
| 5,288,739 A | 2/1994 | Demmel | |
| 6,395,949 B1 | 5/2002 | Drake et al. | |
| 6,556,293 B2 | 4/2003 | Savareigo | |
| 6,835,863 B2 | 12/2004 | Chester et al. | |
| 7,304,194 B2 | 12/2007 | Ghosh et al. | |
| 8,063,258 B2 * | 11/2011 | Bartek et al. | 585/240 |
| 2009/0090046 A1 | 4/2009 | O'Connor et al. | |
| 2010/0152024 A1 | 6/2010 | Stamires et al. | |
| 2010/0209965 A1 | 8/2010 | O'Connor et al. | |

FOREIGN PATENT DOCUMENTS

WO WO 2010/012564 2/2010
WO WO 2010/129170 11/2010

OTHER PUBLICATIONS

McKendry, "Energy production from biomass," Bioresource Technology 83: 37-46 (2002).
Wyman et al., "Coordinated development of leading biomass pretreatment technologies" Bioresource Technology. 96: 1959-1966. (2005).
International Search Report in International Application No. PCT/IUS2012/033629 mailed Jul. 11, 2012.

* cited by examiner

*Primary Examiner* — Cephia D Toomer

(57) ABSTRACT

Catalyst compositions comprising a phosphorous-promoted ZSM-5 component and a silica-containing binder, and methods for making and using same, are disclosed. More specifically, processes for making a catalyst for biomass conversion are provided. The process includes: treating a ZSM-5 zeolite with a phosphorous-containing compound to form a phosphorous-promoted ZSM-5 component; preparing a slurry comprising the phosphorous-promoted ZSM-5 component and a silica-containing binder; and shaping the slurry into shaped bodies. Such catalysts can be used for the thermocatalytic conversion of particulate biomass to liquid products such as bio-oil, resulting in higher bio-oil yields and lower coke than conventional catalysts.

9 Claims, 3 Drawing Sheets

PROCESS FOR CONVERTING BIOMASS TO A FUEL

RELATED APPLICATIONS

The present application claims priority to and the benefit of U.S. Provisional Patent Application No. 61/475,129, filed Apr. 13, 2011, the entire disclosure of which is incorporated herein by reference in its entirety.

FIELD OF THE INVENTION

The invention relates to zeolite-containing catalysts for use in catalytic process and more particularly to catalysts for use in a catalytic pyrolysis process or gasification of solid biomass material.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel, such as methyl or ethyl esters of fatty acids and ethanol. However, using refined biomass feedstock for fuels and specialty chemicals diverts food sources from animal and human consumption, raising financial and ethical issues.

Alternatively, inedible biomass can be used to produce liquid fuels and specialty chemicals. Examples of inedible biomass include agricultural waste such as bagasse, straw, corn stover, corn husks, and the like, and specifically grown energy crops such as switch grass and saw grass. Other examples include trees, forestry waste, such as wood chips and saw dust from logging operations, and waste from paper or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components such as lignin reduces the chemical and physical accessibility of the biomass, which in turn reduces the susceptibility to chemical or enzymatic conversion.

Attempts to produce fuels and specialty chemicals from biomass often result in low value products such as unsaturated and oxygen containing hydrocarbons. Although such low value products can be upgraded into higher value products including conventional gasoline and jet fuel, such upgrading requires specialized and costly conversion processes and refineries, which are distinct from and incompatible with conventional petroleum-based conversion processes and refineries. Thus, the wide-spread use and conversion of biomass to produce fuels and specialty chemicals face many challenges for various reasons. First, large-scale production facilities are not widely available and are expensive to build. Furthermore, existing processes require extreme conditions such as high temperature and pressure, expensive process gasses such as hydrogen, as well as expensive catalysts, all of which increase capital and operating costs. In addition, existing processes not only suffer low conversion efficiency caused by, for example, incomplete conversion or inability to convert lingo-cellulosic and hemi-cellulosic material, but also suffer poor product selectivity.

To date, a need remains for novel and improved processes and catalysts for the conversion of solid biomass materials to produce fuels and specialty chemicals. More specifically, a need exists for improved catalysts that can increase biomass conversion efficiency and increase the yield of desired conversion products.

SUMMARY OF THE INVENTION

Aspects of the invention relate to a process for making a catalyst. The process comprises treating a ZSM-5 zeolite with a phosphorous-containing compound to form a phosphorous-promoted ZSM-5 component; preparing a slurry comprising the phosphorous-promoted ZSM-5 component and a silica-containing binder; and forming the slurry into shaped bodies. In some embodiments, the process further comprises calcining the phosphorous-promoted ZSM-5 component prior to combination with the binder. In certain embodiments, the process can further include calcining the shaped bodies.

In some embodiments, the phosphorous-containing compound in the treating step is phosphoric acid. After treating the ZSM-5 zeolite with the phosphorous-containing compound, the resulting phosphorous-promoted ZSM-5 component can have a pH value of about 3.5, or the pH value may be adjusted to about 3.5.

In the preparing step, the binder can include kaolin, silicic acid, polysilicic acid, silica gel, or any combination thereof. The silica-containing binder can also be derived from silicic acid, sodium silicate, silica gel, or any combination thereof. In some embodiments, the binder can be free or substantially free of amorphous alumina.

The shaped bodies formed during the shaping step, in some embodiments, can be substantially free of amorphous alumina. After the shaping step, the process can further include washing the shaped bodies to adjust the pH value to about 8, and/or calcining the shaped bodies.

Various catalysts and catalyst systems prepared according to the processes described herein are also provided. In various embodiments, such catalysts and catalyst systems have a minimized amount of amorphous alumina, or are free of or substantially free of amorphous alumina.

Another aspect of the invention relates to a process for the conversion of particulate biomass to fuels. The process comprises: treating a ZSM-5 zeolite component with a phosphorous-containing compound forming a phosphorous-promoted ZSM-5 component; preparing a slurry comprising the phosphorous-promoted ZSM-5 component and a silica-containing binder; shaping slurry into shaped bodies; and contacting the particulate biomass with the shaped bodies within a reactor under conditions suitable for biomass conversion.

In some embodiments, the phosphorous-containing compound in the treating step is phosphoric acid. In the preparing step, the silica-containing binder can include kaolin, silicic acid, polysilicic acid, silica gel, or any combination thereof. In some embodiments, the binder can be free of or substantially free of amorphous alumina.

The shaped bodies from the shaping step, in some embodiments, can be free of or substantially free of amorphous alumina. After the shaping step, the process can further include washing the shaped bodies to adjust the pH value to about 8. The shaped bodies can also be calcined before the contacting step. In the contacting step, the reactor, in some embodiments, can be a fluidized bed reactor.

In various embodiments, a yield of the fuel produced by catalysts and processes of the present invention is higher than that produced by a biomass conversion method without the reacting and/or preparing steps. For example, the yield of bio-oil and other useful products can be about 5%, about 10%, about 20%, about 25%, about 30%, or about 50% (or more or less) higher than using conventional catalysts. In addition, coke resulting from catalysts and processes of the present invention is lower than that from a biomass conversion method without the reacting and/or preparing steps. In certain examples, the coke can be about 5%, about 10%, about 20%, about 25%, about 30%, or about 50% (or more or less) lower than using conventional catalysts.

DETAILED DESCRIPTION OF THE INVENTION

Figure 1:
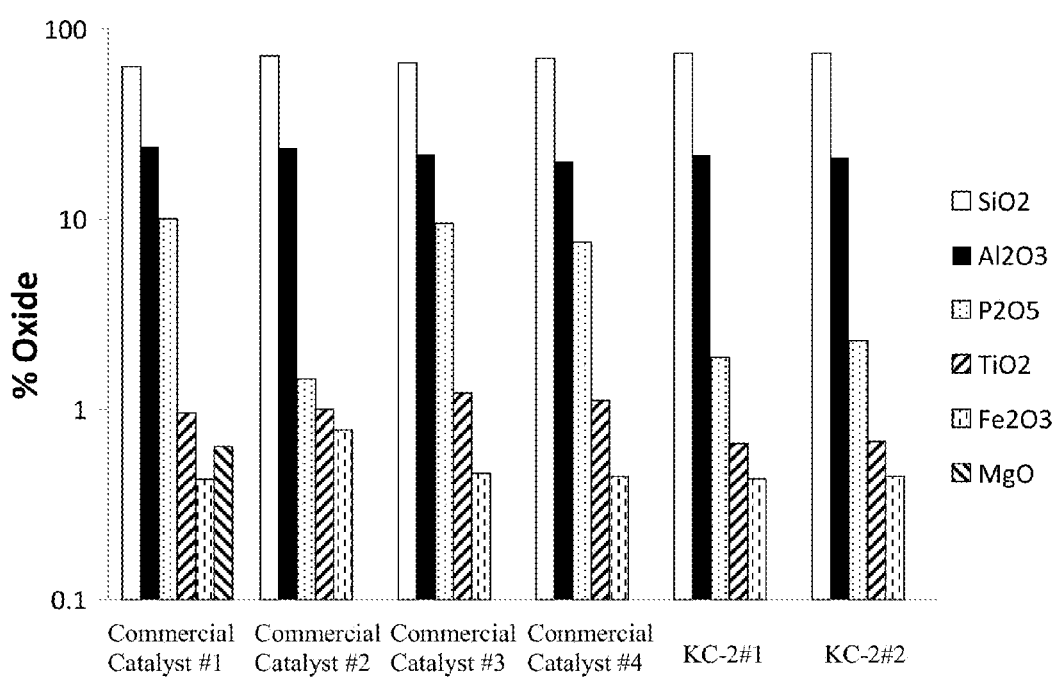
FIG. 1 illustrates amount of various oxides present in certain catalysts before and after steaming.

Unless defined otherwise, all technical and scientific terms used herein have the same meaning as commonly understood by one of ordinary skill in the art to which this invention pertains. For example, one of ordinary skill would understand that certain ASTM specifications referenced in this disclosure, such as ASTM D5757 and B329, are international standards for various materials, products and systems published by ASTM International. Such ASTM specifications such as ASTM D5757 and B329 are incorporated herein by reference in their entirety.

It is understood that the terminology used herein is for the purpose of describing particular embodiments only and is not intended to be limiting. As used in this specification, the singular forms "a", "an", and "the" include plural referents unless the content clearly indicates otherwise. Also, certain patents, published applications and non-patent publications have been incorporated by reference. However, the text of such patents, published applications and non-patent publications is only incorporated by reference to the extent that no conflict exists between such text and other statements set forth herein. In the event of such conflict, then any such conflicting text in such incorporated by reference patents, published applications and non-patent publications is specifically not so incorporated herein.

In the following description, all numbers disclosed herein are approximate values, regardless whether the word "about" or "approximate" is used in connection therewith. They may vary by 1%, 2%, 5%, or, sometimes, 10 to 20%. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

Aspects of the invention relate to catalysts as well as methods, systems and compositions for converting solid biomass into fuels and/or specialty chemicals in the presence of a catalyst. Suitable biomasses, or biomass materials, can include any biological material derived from living, or previously living organisms. More particularly, non-limiting examples of biomass materials suitable for use in the process described herein can include inedible materials, which do not compete with the food supply as well as materials that can be easily grown, or materials that are otherwise readily available, such as grasses, saw dust, wood chips, wood bark, twigs, straw, corn stover, cotton linters, bagasse, and the like. In various embodiments, biomasses include materials of photosynthetic origin such as plants, and can be predominately comprised of cellulose, hemicellulose, and/or lignin.

Aspects of the invention relate to improved pyrolysis processes for converting solid biomass to a bio-oil or bio-oil vapor or gas in the presence of a catalyst or catalyst composition or system. In general, pyrolysis of biomass materials can be carried out thermally, in the absence of a catalyst or in the presence of a catalyst. Pyrolysis processes can produce gaseous products such as $CO_2$, $CO$, $CH_4$, $H_2$ and $C_2H_4$, liquid products such as pyrolysis oil or bio-oil, and solid products including coke, char and ash. Because gaseous and liquid products are of higher utility and economic value than solid products, the present invention provides improved pyrolysis processes that can be used to produce more liquid products and/or gas products, while making less char and coke. In particular, improved catalysts and catalyst systems for pyrolysis are provided by the present invention. In some embodiments, the catalyst has improved hydrothermal stability and/or improved deoxygenation activity. Such catalysts can be used for the thermocatalytic conversion of particulate biomass to liquid products such as bio-oil, resulting in higher bio-oil yields and lower coke.

Thermocatalytic conversion of biomass can be conducted in a fluidized bed reactor. The bio-oil product may be converted to suitable liquid transportation fuels in modified refinery processes such as fluid catalytic cracking, hydroconversion, thermal conversion, and the like. In these processes, the bio-oil may be the sole feedstock, or it may be blended with conventional, crude oil-based feedstocks. Examples of useful liquid products include fuel such as jet fuels, diesel, and heating oil. Example of useful gases include ethane, propylene, butane and butenes.

Catalyst Preparation

As used herein, the term "catalyst" refers to any material or totality of materials used in the pyrolysis reaction to provide catalytic functionality. It should be understood that the catalysts may encompass composite particles comprising two or more materials. Catalysts as used herein facilitate the conversion of organic components of the biomass into bio-oils, fuels, specialty chemicals or precursors thereof. The term "catalyst system" as used herein refers to the totality of materials used in the pyrolysis reaction to provide catalytic functionality.

In some aspects of the invention, the catalysts can be made from a zeolite moiety. Zeolites are selected due to the high concentration of active acid sites, high thermal and hydrothermal stability, and well-defined molecular size and shape selectivity. In some embodiments, the zeolite is a ZSM-like zeolite, and ion exchanged forms thereof, such as H-ZSM, Zn-ZSM, Mg-ZSM, and the like. For example, the zeolite can be ZSM-5 zeolite. High silica zeolites can also be used. In some embodiments, the starting catalyst includes zeolite ZSM-5.

The starting catalyst can be treated to improve its catalytic activity and other properties. For example, a ZSM-5 zeolite can be combined or pretreated with a phosphorus-containing compound to form a phosphorous-promoted zeolite component. The phosphorus-containing compound can be any compound containing phosphorus, such as phosphorus oxyacids and organophosphorus compounds. In one example, the phosphorus-containing compound is phosphoric acid ($H_3PO_4$). The phosphorus-containing compound can be used at a concentration of about 0.01 wt % to about 90 wt %, about 50 wt %, about 60 wt %, about 70 wt %, about 80 wt %, or about 90 wt %. In some embodiments, the zeolite can be treated with the phosphorus-containing compound at temperatures ranging from about 20° C. to about 30° C., or about 25° C., for about 10 minutes to about 24 hours. After adding the phosphorus-containing compound such as phosphoric acid, the pH can be adjusted, for example, with ammonium hydroxide to a pH value of about 4, about 3.5, or about 3.

After treating the zeolite with the phosphorus-containing compound, the resulting phosphorous-promoted zeolite component can be dried. In some embodiments, the phosphorous-promoted zeolite component can be further calcined in the presence of oxygen to convert the phosphorous into oxide. After calcination, the calcined powder can be re-slurried in water. The slurry can be adjusted to have a pH value of about 4, about 3.5, or about 3.

After the phosphorous pretreatment, the resulting phosphorous-promoted ZSM-5 component can be combined with a binder. Any commercially available binder material can be used. The binder material is typically inert and does not have significant catalytic activity. When used in or with catalysts, binders can provide support and increase catalyst activity. In some embodiments, a silica-containing binder can be used. The binder can be free of or substantially free of amorphous alumina. For example, the binder can be silicic acid, polysilicic acid, silica gel, or any combinations thereof. In some embodiments, the binder is a mixture of silicic acid and clay or a mixture of polysilicic acid and clay. The clay can be kaolinite clay. In some embodiments, the content of the binder ranges from about 3 to about 35 weight percent (wt %).

A slurry of the binder and the phosphorous-promoted zeolite component can be prepared according to any methods known in the art. For example, the slurry can then be spray dried. The spray dried mixture can then be washed with water and/or ammonium hydroxide. The pH of the mixture can also be adjusted to desired value. After washing, the mixture can be dried, calcined and formed into shaped bodies.

In some embodiments, a slurry comprising the catalyst is compounded into shaped bodies such as powders, particles, and/or microspheres. Shaping can be performed by any suitable method known in the art to obtain particles with the appropriate size and strength. For example, modified clays can be compounded into shaped bodies by spray drying, extrusion, pelletizing, beading or any other conventional shaping method used in the catalyst or adsorbent field, or any combinations of these methods. In some embodiments, the resulting shaped bodies are free of or substantially free of amorphous alumina.

The shaped bodies can have an average particle diameter that is suitable for biomass fluid cracking catalysts, for example, similar to the average size of the particulate biomass used. In some embodiments, the average particle size of the catalyst ranges from about 100-1000 μm, about 150-800 μm, about 200-700 μm, or about 250-500 μm.

Biomass Conversion

Catalysts prepared according to the methods described herein can be used in biomass conversion to produce useful products such as bio-oil, with improved yield and lower coke. As such, certain aspects of the present invention relate to a process for treating a biomass with a catalyst comprising an ex-situ phosphorous-activated zeolite and a silicic acid binder, under less severe conditions than conventional biomass conversion methods. Less severe conditions include, for example, lower temperatures and/or shorter reaction times. In some embodiments, the use of improved catalysts leads to an increase of the yield of organic compounds useful as a fuel, feedstock, and specialty chemical. Another advantage of using the improved catalysts is the reduction of the amount of undesirable by-products such as coke, tar and unconverted biomass. In certain embodiments, coke produced in biomass conversion using catalysts of the present invention is about 20%, about 25%, about 30%, or about 50% (or more or less) lower than using conventional catalysts such as Super Z™ (Intercat Inc., Manasquan, N.J., USA).

Without limitation, the fuel may be used as gasoline, as a feedstock for gasoline blending, as diesel fuel, as a basis for blending a diesel fuel, as jet fuel, as a basis for a jet fuel, as a feedstock for the petrochemical industry, and in connection with other similar uses. Such fuels can have a lower carbon footprint, as compared to purely petroleum based refinery liquids, and such fuels may have a higher heating value than other renewable fuel, such as compared to ethanol/gasoline blends, which may result in increased gas mileage to the consumer.

The invention will be further clarified by a consideration of the following examples, which are intended to be purely exemplary of the present invention.

EXAMPLES

Example 1

Preparation of a Catalyst Containing Phosphorous-Promoted ZSM-5 Component and a Silica-Containing Binder A catalyst (referred to herein as "KC-2" catalyst) having the following formulation was prepared:
30 wt % P-ZSM-5, 9 wt % $P_2O_5$ on zeolite;
26 wt % silicic acid binder;
43.7 wt % kaolin (BASF ASP-600); and
0.3 wt % tetrasodium pyrophosphate (TSPP).

Two samples of the KC-2 catalyst (referred to as "KC-2#1" and "KC-2#2") were prepared and analyzed as described below.

ZSM-5 Phosphorous Pretreatment

ZSM-5 powder was slurried in water at 35% solids. The slurry was stirred for 15 minutes to disperse the powder properly at a temperature is in the range of 20-25° C.

In less than 30 seconds, the calculated amount of $H_3PO_4$ (56-85 wt %) was added to the ZSM-5 slurry (6-9 wt % based on the dry basis weight of the ZSM-5). The components were mixed for 5 minutes and pH was checked to be in the range of 1.8-2.5. The temperature change of slurry was negligible.

The pH of the slurry was slowly adjusted to pH 4.0±0.2 with ammonium hydroxide solution ($NH_4OH$ 29%). For example, for a 50 kg batch size about 1.3 kg $NH_4OH$ was used. No temperature change was observed. The slurry was mixed for 15 minutes. The final slurry density was about 1.18-1.22 g/ml.

The slurry was spray dried at 130-140° C. outlet temperature and 340-370° C. inlet temperature and feed pressure of about 500 psi using a #20 nozzle. Both the product and fines were collected from the bag house. The bag house and spray dryer were thoroughly cleaned before the run to minimize contamination. The weight of collected product was recorded.

The resulting powder (product and fines) was calcined at 600° C. for 4 hours in muffle furnace. The phosphorus retention of calcined P-ZSM-5 was checked as follows. Ten grams of calcined powder were placed in 90 g water in a polypropylene bottle. The bottle was placed in a water or oil bath (98° C.) for one hour. The bottle was removed from the water bath; filtered and rinsed with equal volume of water. The resulting product was dried and calcined at 600° C., resulting in a solid material. The phosphorous amount was checked by XRF analysis. $P_2O_5$ retention may be greater than 60% and preferably greater than 70%.

The calcined phosphated powder was re-slurried in water at 35% solids and thoroughly milled and dispersed using a 1-gallon blender (Waring CB-15 industrial 1-gallon blender) for about 5 minutes. For larger preparations, this step could be done using a bead mill. Slurry milling is preferred over dry milling. D50 may be less than about 3.5 µm. D90 is less than about 10 µm. Temperature was kept so as not to exceed 55° C.

The pH of the final slurry was adjusted to 3.5 with a small amount (about 100 g) of dilute ammonium hydroxide ($NH_4OH$ at 29 wt %) in order to be compatible with the pH of silicic acid solution.

Catalyst Preparation Recipe (Batch Silicic Acid Route)

The heel was prepared in a mix tank. Water and ice (50:50 wt/wt at 3-6° C.) and small amount (0.2 kg) of $H_2SO_4$ (50 wt %) were mixed to lower pH to about 2.0±0.2. Dispersant (TSPP) was added to the heel (0.3 wt % based on dry weight of kaolin) (mixture 1).

Separately dilute sodium silicate solution (14.5 wt % $SiO_2$) was prepared by mixing water with sodium silicate (29% $SiO_2$) and stirred thoroughly for 5 minutes (mixture 2).

Simultaneously, the diluted sodium silicate solution (mixture 2) and $H_2SO_4$ (50 wt %) were added to the heel (mixture 1) with vigorous mixing (mixture 3). The sodium silicate solution was added at a constant rate (1.2 kg/min), while the $H_2SO_4$ was added to maintain the pH of the solution at 2.0±0.2. After about 80% of the sodium silicate solution was added, the addition rate was reduced to 0.6 kg/minutes, while continuing the addition of the $H_2SO_4$, such that the final pH of the solution is 3.5±0.2. The estimated quantity of sulfuric acid required was based on the factor that 0.2936 kg $H_2SO_4$/kg $Na_2SiO_3$ was used. $SiO_2$ concentration in silicic acid sol may be between 6.9-7.4%. The gel time of the silicic acid solution may be ≥4 hours.

Dry kaolin powder was slowly added (ASP-600) to the sol (mixture 3) taking care that the kaolin visibly disperses. Mixing was continued for 5 minutes. The use of shearing dispersion equipment such as Arde-Barinco mixers is preferred for kaolin dispersion.

The Phosphorous-ZSM-5 slurry was poured into the kaolin-silicic acid solution (mixture 4) and mixed for 15 minutes. The pH of the final slurry may be in the range of 3.3 to 3.5. Temperature was in the range of 16-22° C.

The mixture was spray dried using #20 nozzle and at outlet temperature of 130-140° C., inlet temperature of 340-370° C. and feed pressure of 500 psi. The product was collected and was screened/classified: particle size about 20 µm was less than about 1%, and particle size about 150 µm was less than about 10%. The catalyst from the spray dryer, without further processing, is referred to as crude catalyst and was further subjected to washing/exchanging procedures.

Crude Catalyst Washing/Exchanging Procedure

The crude catalyst was slurried in hot (60-70° C.) process water (4 times crude catalyst weight) while simultaneously dosing with ammonium hydroxide ($NH_4OH$) to prevent the pH from dropping below 3.5 (step 1). The pH was adjusted to 3.5-4 is using $NH_4OH$ (step 2).

Ammonium sulfate $(NH_4)_2SO_4$ (0.1 times the crude catalyst weight) is added to the slurry (step 3). The slurry was mixed for 10 minutes and filtered (step 4). The filter cake was re-slurried using hot process water and $(NH_4)_2SO_4$ as in step 3 maintaining a pH of 3.5-4.0 (step 5). This step (step 5) was repeated at least once. The filter cake was re-slurried in hot process water adjusting the pH to 8.0-8.5 with $NH_4OH$. The slurry was mixed for 10 minutes then filtered. The filter cake was washed with hot water (2 times the crude catalyst weight). The catalyst was dried in an oven at about 110° C. overnight.

The catalyst was placed in furnace, once dry, and calcined at 500° C. for 4 hours allowing a 3-hour window for the furnace to ramp up to the desired temperature.

Analytical Methods and Specifications

Catalyst samples were tested according to the methods listed in Table 1. All tests were standard except that the LOI required air calcination in a muffle furnace at 600° C. for 1 hour. Samples were stored in a dessicator between analyses.

TABLE 1

| Catalyst Property | Parameter | Range | Method Used |
|---|---|---|---|
| Attrition by Air Jet | AI 3 × 5 hr | 10.0 max | ASTM D5757 |
| Particle Size Distribution | % 0-20 µm | 2.0 max | Malvern Mastersizer 200E |
|  | % >150 µm | 10.0 max | Dry Cell |
| $H_2O$ PV by Centrifuge | $PV_{tot}$, cm$^3$/g | 0.30-0.35 | J. Coll. Int. Sci. 78 (1) 1980 (submitted to ASTM) |
| Apparent Bulk Density | ABD, g/cm$^3$ | 0.72-0.78 | ASTM B329 |
| Loss on Ignition at 950° C. | LOI-950° C., % | 8.0% max | Calcined version |
|  | LOI-950° C., % | 18.0% max | Uncalcined version |
| d | Total: TSA, m$^2$/g | 80-180 m$^2$/g | BET plot, p/p$_o$ = 0.01-0.10 |
|  | Meso: MSA, m$^2$/g | 20-50 | t-plot, 3.5 to 5.0 Å |
|  | Micro: ZSA, m$^2$/g | 50-120 | ZSA = TSA − MSA |
| X-Ray Fluorescence | % $Al_2O_3$ | 20.0-24.0% | Rigaku XRF Model |
|  | % $P_2O_5$ | 2.2-3.2% |  |
|  | % $SiO_2$ | 73.0-77.0% |  |
|  | % $Na_2O$ | 0.2% max |  |
|  | % $SO_4$ | 0.2% max |  |
|  | % $Fe_2O_3$ | 0.5% max |  |
|  | % $TiO_2$ | 0.6-1.0% |  |
|  | % CaO | 0.1% max |  |

Example 2

Comparison of the Amount of Amorphous Alumina Present in KC-2 and Super Z™ and the Effect of Steaming Nitric acid extraction was used to determine the amorphous alumina content in each of the different catalysts using the procedure described herein. Twenty grams of each catalyst was mixed at room temperature for one hour with 100 g of different concentration of nitric acid (1, 3, 5, 10 or 20% v/v concentration). The mixture samples were filtered, washed with equal amounts of deionized water, dried and calcined at 600° C. before total surface analysis and XRF analysis was performed. A deionized (DI) water wash was used as a control.

Two catalyst KC-2 samples, KC-2#1 and KC-2#2 having the following formulation 30 wt % P-ZSM-5/26 wt % silicic acid binder/43.7 wt % kaolin (BASF ASP-600)/0.3 wt % TSPP were compared to four commercially available Fluid Catalytic Cracking (FCC) catalysts including the Super Z™ catalyst. The commercially available FCC catalysts are identified as "Commercial Catalyst #1," "Commercial Catalyst #2," "Commercial Catalyst #3," and "Commercial Catalyst #4" in the figures.

The weight percentage amount of six oxides ($SiO_2$, $Al_2O_3$, $P_2O_5$, $TiO_2$, $Fe_2O_3$, MgO) present in all catalysts studied was analyzed and shown in FIG. 1.

Figure 2A:
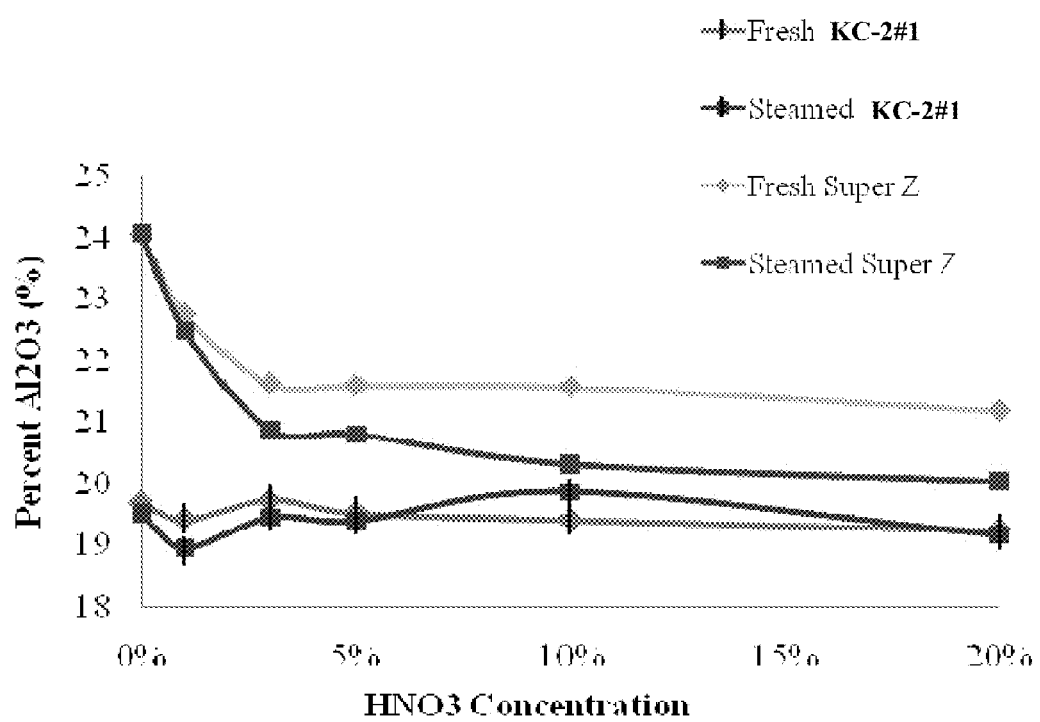
FIGS. 2A and 2B illustrate the percentage of alumina remaining in various catalysts, before and after nitric acid leaching.

The alumina remaining in the catalysts, before and after nitric acid leaching, at various concentrations was analyzed. As shown in FIG. 2A, removal of alumina in Super Z™ catalyst increased with increasing concentration of nitric acid and Super Z™ catalysts had about 3 wt % of amorphous alumina removed by nitric acid (percent alumina reduced from about 24% to about 21% after leaching at higher nitric acid concentration). Thus, without being limited by theory, removal of alumina from Super Z™ catalyst at higher nitric acid concentration suggests that amorphous alumina may play a role in the binding of the catalyst. In contrast, the alumina content in the KC-2 catalyst is relatively stable after treatment of the catalyst with nitric oxide, suggesting the presence of a minimum amount of amorphous alumina (less than, for example, about 1% or about 0.5%) to no amorphous alumina in the KC-2 catalyst.

Figure 2B:
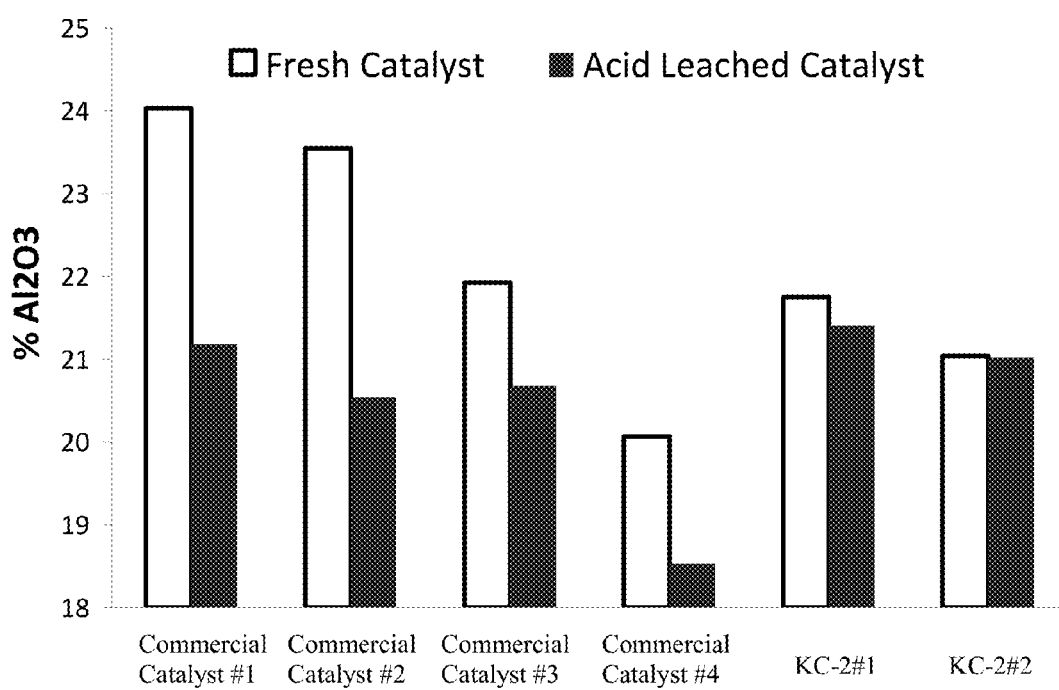

In FIG. 2B, the amounts of alumina in KC-2#1 and KC-2#2 were compared to those of various commercially available FCC catalysts, before and after acid leaching. The amounts of alumina in KC-2#1 and KC-2#2 remained stable after acid leaching, suggesting that KC-2#1 and KC-2#2 are substantially free of amorphous alumina (less than about 0.5%). In contrast, commercially available FCC catalysts contain significant amount of amorphous alumina, ranging from about 1.5% to about 4%.

The present invention provides among other things methods for converting biomass into bio-fuel and chemicals. While specific embodiments of the subject invention have been discussed, the above specification is illustrative and not restrictive. Those of ordinary skill in the art may, upon reading and understanding this disclosure, appreciate changes and modifications which may be made which do not depart from the scope and spirit of the invention as described above or claimed hereafter. Accordingly, this description is to be construed as illustrative only and is for the purpose of teaching those skilled in the art the general manner of carrying out the invention. The full scope of the invention should be determined by reference to the claims, along with their full scope of equivalents, and the specification, along with such variations.

The invention claimed is:

1. A process for the conversion of particulate biomass to a fuel, the process comprising:
    (a) treating a ZSM-5 zeolite component with a phosphorous-containing compound forming a phosphorous-promoted ZSM-5 component;
    (b) preparing a slurry comprising the phosphorous-promoted ZSM-5 component and a silica-containing binder, wherein the silica-containing binder comprises silicic acid, polysilicic acid, or a combination of silicic acid and polysilicic acid;
    (c) shaping the slurry into shaped bodies; and
    (d) contacting the shaped bodies with a particulate biomass in a reactor under conditions suitable for biomass conversion to a fuel.

2. The process of claim 1, wherein in step (a), the phosphorous-containing compound is phosphoric acid.

3. The process of claim 1, further comprising, prior to step (d), washing the shaped bodies to adjust to a pH value of about 8.

4. The process of claim 1, further comprising, prior to step (d), calcining the shaped bodies.

5. The process of claim 1, wherein in step (d), the reactor is a fluidized bed reactor.

6. The process of claim 1, wherein one or both of the silica-containing binder and shaped bodies are free of or substantially free of amorphous alumina.

7. The process of claim 1, wherein a yield of the fuel is higher than that produced by a biomass conversion method without step (a) or (b).

8. The process of claim 1, wherein a coke resulting from step (d) is lower than that from a biomass conversion method without step (a) or (b).

9. A process for the conversion of particulate biomass to a fuel, the process comprising:
    (a) treating a ZSM-5 zeolite component with a phosphorous-containing compound forming a phosphorous-promoted ZSM-5 component;
    (b) calcining the phosphorous-promoted ZSM-5 component;
    (c) preparing a slurry comprising the calcined phosphorous-promoted ZSM-5 component and a silica-containing binder;
    (d) shaping the slurry into shaped bodies; and
    (e) contacting the shaped bodies with a particulate biomass in a reactor under conditions suitable for biomass conversion to a fuel.

* * * * *